(12) United States Patent
Dang et al.

(10) Patent No.: US 7,678,464 B2
(45) Date of Patent: Mar. 16, 2010

(54) SUBSTRATE WITH ANTI-SOILING COATING

(75) Inventors: Hao Thien Dang, Tampa, FL (US); Yannick Moysan, Belleair, FL (US)

(73) Assignee: Essilor International Compagnie Generale d'Optique, Charenton-le-Pont (FR)

( * ) Notice: Subject to any disclaimer, the term of this patent is extended or adjusted under 35 U.S.C. 154(b) by 981 days.

(21) Appl. No.: 10/557,284

(22) PCT Filed: Oct. 21, 2005

(86) PCT No.: PCT/EP2005/011415

§ 371 (c)(1), (2), (4) Date: Nov. 17, 2005

(87) PCT Pub. No.: WO2006/045582

PCT Pub. Date: May 4, 2006

(65) Prior Publication Data

US 2007/0026237 A1 Feb. 1, 2007

Related U.S. Application Data

(60) Provisional application No. 60/621,142, filed on Oct. 22, 2004.

(51) Int. Cl.
*B32B 27/30* (2006.01)
(52) U.S. Cl. ..................... 428/451; 428/331
(58) Field of Classification Search ............. 428/331, 428/451

See application file for complete search history.

(56) References Cited

U.S. PATENT DOCUMENTS

| | | | | |
|---|---|---|---|---|
| 4,410,563 A | | 10/1983 | Richter et al. | ............... 427/108 |
| 5,258,225 A | * | 11/1993 | Katsamberis | ............... 428/331 |
| 6,183,872 B1 | | 2/2001 | Tanaka et al. | ............... 428/429 |
| 6,277,485 B1 | | 8/2001 | Invie et al. | ............... 428/336 |
| 6,322,860 B1 | * | 11/2001 | Stein et al. | ............... 428/1.26 |
| 7,217,440 B2 | * | 5/2007 | Jallouli et al. | ............... 427/162 |

FOREIGN PATENT DOCUMENTS

| | | |
|---|---|---|
| EP | 0 203 730 | 12/1986 |
| EP | 0 749 021 | 12/1996 |
| EP | 0 844 265 | 5/1998 |
| EP | 0 933 377 | 8/1999 |

OTHER PUBLICATIONS

Owens and Wendt, "Estimation of the surface forces energy of polymers," *J. Appl. Polym. Sci.*, 13:1741-1747.
Sobieski and Tangney, "Silicone Pressure Sensitive Adhesives," Handbook of Pressure-Sensitive Adhesive Technology, $2^{nd}$ ed., pp. 508-517 (D. Satas, Ed.), Van Nostrand Reinhold, New York, 1989.

* cited by examiner

*Primary Examiner*—D. S Nakarani
(74) *Attorney, Agent, or Firm*—Fulbright & Jaworski L.L.P.

(57) ABSTRACT

A substrate having at least one main surface comprising a first coating deposited on said main surface and a second coating having anti-soiling properties deposited and adhering on the surface of said first coating,
  the first coating being a (meth)acrylate based coating and being obtained by polymerizing a polymerizable composition comprising:
    i) at least one (meth)acrylate compound and
    ii) at least one compound I having at least one —M—Z' bond with M representing Si or a Metal atom, Z' representing OH or a hydrolysable group, and at least one ethylenic unsaturated group or epoxy group, and/or
    iii) at least one silica or metal oxide colloid having free ethylenically unsaturated groups; and
  the second coating, having anti-soiling properties, being obtained by depositing on said first coating an anti-soiling coating composition comprising at least one compound II, or a hydrolyzate thereof, having at least one —Si—Z" group with Z" representing OH or a hydrolysable group.

15 Claims, No Drawings

SUBSTRATE WITH ANTI-SOILING COATING

This application is a national phase application under 35 U.S.C. §371 of International Application No. PCT/EP2005/011415 filed October 21, 2005. which claims the benefit of U.S. Provisional Application No. 60/621,142 filed Oct. 22, 2004, the contents of which are incorporated herein by reference.

BACKGROUND OF THE INVENTION

1. Field of the Invention

The invention relates to substrates coated with a modified (meth)acrylate based coating, providing good scratch resistance along with interfacial adhesion with an anti-soiling coating, especially a fluorinated hydrophobic coating, deposited thereon.

The invention also relates to a coating composition comprising a (meth)acrylate based coating composition, usable for obtaining the coated substrate here above mentioned and a corresponding coated substrate able to be coated with an anti-soiling coating.

The invention is preferably used for manufacturing ophthalmic lenses coated, especially on their back side (concave side), with the coating of the invention and that subsequently can be treated with an anti-soiling coating.

2. Description of Related Art

It is well known in the field of ophthalmic lenses to apply anti-soiling coatings, especially hydrophobic and/or oleophobic top coats having low surface energy on antireflective (AR) stacks.

The anti-soiling has generally reactive groups such as SiO-alkyl groups, Si—Cl, Si—NH$_2$ or Si—NH— groups that can hydrolyze and react with pendant reactive groups at the surface of the AR.

When the anti-soiling coating is deposited on inorganic AR layers that have been vapour deposited, there is generally no severe problems of adhesion between the AR and the anti-soiling coating.

When the anti-soiling coating is deposited on another coating, especially those of organic nature, such as an abrasion resistant coating, adhesion problems are encountered.

According to the invention, it was found that it is necessary to use a specific coating composition in order to obtain a good adhesion at the interface between the coating and the anti-soiling coating.

SUMMARY OF THE INVENTION

A substrate according to the invention is a substrate having at least one main surface comprising a first coating deposited on said main surface and a second coating having anti-soiling properties deposited and adhering on the surface of said first coating, the first coating being a (meth)acrylate based coating and being obtained by polymerizing a polymerizable composition comprising i) at least one (meth)acrylate compound and ii) at least one compound I having at least one —M-Z' bond with M representing Si or a Metal atom, Z' representing OH or a hydrolysable group and at least one ethylenic unsaturated group, or epoxygroup, preferably an ethylenic unsaturated group, and/or iii) at least one silica or metal oxide colloid having free ethylenic unsaturated groups;

and the second coating, having anti-soiling properties, being obtained by depositing on said first coating an anti-soiling coating composition comprising at least one compound II, or a hydrolyzate thereof, having at least one —Si—Z" group with Z" representing OH or a hydrolysable group.

DETAILED DESCRIPTION OF THE INVENTION AND PREFERRED EMBODIMENTS

By "ethylenic unsaturated group" there is meant a group comprising a

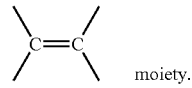
moiety.

By "free ethylenic unsaturated group" there is meant a group comprising the above defined moiety which capable of reacting with the (meth) acrylate compounds of i).

The coating formulation is designed to improve the hydrophobicity which leads to the ease of cleaning.

The main component of the (meth)acrylate based coating compositions may be chosen between monofunctional (meth)acrylates and multifunctional (meth)acrylates such as difunctional (meth)acrylates; trifunctional (meth)acrylates; tetrafunctional (meth)acrylates, pentafunctional(meth)acrylates, hexafunctional (meth)acrylate.

Examples of such monomers are:

Monofunctional (meth)acrylates: Allyl methacrylate, 2-ethoxyethyl acrylate, 2-ethoxyethyl methacrylate, caprolactone acrylate, isobornyl methacrylate, lauryl methacrylate, polypropylene glycol monomethacrylate.

Difunctional (meth)acrylates: 1,4-butanediol diacrylate, 1,6-hexanediol diacrylate, 1,6-hexanediol dimethacrylate, polyethylene glycol diacrylate, tetraethylene glycol diacrylate, polyethylene glycol dimethacrylate, polyethylene glycol diacrylate, ethoxylated bisphenol A diacrylate, tetraethylene glycol diacrylate, tripropylene glycol diacrylate, neopentyl glycol diacrylate, 1,4-butanediol dimethacrylate, tetraethylene glycol dimethacrylate, diethylene glycol diacrylate.

Trifunctional (meth)acrylates: Trimethylolpropane trimethacrylate, Trimethylolpropane triacrylate, pentaerythritol triacrylate, ethoxylated trimethylolpropane triacrylate. Trimethylolpropane trimethacrylate.

Tetra to hexa(meth)acrylates: Dipentaerythritol pentaacrylate, pentaerythritol tetraacrylate, ethoxylated pentaerythritol tetraacrylate, pentaacrylate ester, silicone hexaacrylate.

The preferred compounds I are ethylenically unsaturated alkoxysilanes which can be, for example, vinylsilanes, allylsilanes, acrylic silanes or methacrylic silanes.

Examples of vinylsilanes are vinyltri(2-methoxyethoxy)silane, vinyltrisisobutoxysilane, vinyltri-t-butoxysilane, vinyltriphenoxysilane, vinyltrimethoxysilane, vinyltriisopropoxysilane, vinyltriethoxysilane, vinyltriacetoxysilane, vinylmethyldiethoxysilane, vinylmethyldiacetoxysilane, vinylbis(trimethylsiloxy)silane and vinyldimethoxyethoxysilane.

Examples of allylsilanes are allyltrimethoxysilane, allyltriethoxysilane and allyltris(trimethylsiloxy)silane.

Examples of acrylic silanes are 3-acryloxypropyltris(trimethylsiloxy)silane, 3-acryloxypropyltrimethoxysilane, acryloxypropylmethyldimethoxysilane, 3-acryloxypropylmethylbis(trimethylsiloxy)silane, 3-acryloxypropyl-dimethyl methoxysilane, n-(3-acryloxy-2-hydroxypropyl)-3-aminopropyltriethoxysilane.

Examples of methacrylic silanes are 3-methacryloxypropyltris (vinyldimethoxysiloxy)silane, 3-methacryloxypropyltris(trimethylsiloxy)silane, 3-methacryloxypropyltris(methoxyethoxy)silane, 3-metacryloxypropyltrimethoxysilane, 3-methacryloxypropylpentamethyldisiloxane, 3-methacryloxypropylmethyl-dimethoxysilane, 3-methacryloxypropyl-methyldiethoxysilane, 3-methacryloxypropyl-dimethyl-methoxysilane, 3-methacryloxypropyldimethylethoxysilane, 3-methacryloxypropenyltrimethoxysilane and 3-methacryloxypropylbis (trimethylsiloxy)methylsilane.

The preferred silane is acryloxypropyltrimethoxysilane.

Other preferred compounds of formula I are zirconium methacrylate, titanium trimethacrylate, methacryloxyethoxytriisopropoxytitanate, titanium methacrylate triisopropoxide, zirconium methacryloxyethyl acetoacetate tri-n-propoxide.

Silica colloids having free ethylenically unsaturated groups are for example: OG-103 silica colloids functionalized with hexanedioldiacrylate.

Among the epoxyalkoxy silanes usable as compounds I there may be cited γ-glycidoxyprolylpentrimethyldisiloxane, γ-glycidoxypropylmethyldiisopropenoxysilane, (γ-glycidoxypropyl)-methyldiethoxysilane, γ-glycidoxypropylmethylethoxysilane, γ-glycidoxypropyldiisopropylethoxysilane and (γ-glycidoxypropyl)bis-(trimethylsiloxy)methylsilane.

The preferred epoxyalkoxysilane is (γ-glycidoxypropyl) trimethoxysilane.

Examples of useful alkoxysilanes are tetraethoxysilane and methyltrimethoxysilane.

Of course, mixtures of ethylenically unsaturated alkoxysilanes and epoxyalkoxy silanes as above may be used as compounds I.

The (meth)acrylate coating composition can also comprise:

1) Metal alkoxides without ethylenically unsaturated groups, for example tetraethoxysilane (semi-metal), zirconium propoxides, zirconium isopropoxide, tungsten VI ethoxide, tungsten V ethoxide, titanium n-propoxide, 2-titanium isobutoxide, tantalum V ethoxide, indium methyl trimethyl acetyl acetate, hafnium ethoxide, hafnium butoxide, germanium ethoxide, germanium butoxide, cerium butoxide, antimony butoxide, aluminum butoxide, tungsten ethoxide.

These metal alkoxides enhance the effect of compound I or of the silica or metal colloids having free ethylenically unsaturated groups.

2) Alkoxysilanes.

Examples of useful alkoxysilanes are tetraethoxysilane and methyltrimethoxysilane.

3) Non silane epoxy compounds:

1,4-butanediol diglycidyl ether, bisphenol F epoxy, bisphenol A epoxy, epoxy phenol novalac, alicyclic diepoxy carbonate. Propylene glycol glycidyl ether, cycloaliphatic diepoxide, 2,4, oxirane-2-ylmethoxybutoxymethyl oxirane, 2,2, 2-bis oxirane-2-yloxymethylbutoxyoxirane.

Preferably, the (meth)acrylate based curable coating composition is photocurable, preferably UV curable.

Preferably, the (meth)acrylate based curable coating composition comprises a surfactant that can be covalently bounded to the polymer matrix of the (meth)acrylate based curable composition. This surfactant is preferably an acrylated silicone oligomer and is used in a weight ratio less than 2%, based on the total weight of the composition, preferably in a weight of 1% or less. Of course, the acrylated silicone oligomers used as surfactant ratio are compounds different from compounds I.

The (meth)acrylate based curable layer can be used as a hard coating that has a thickness of preferably 1 to 6 microns, and better between 2 to 5 microns with a nominal thickness of 3 microns for the ophthalmic lens application.

It may be deposited directly on the surface of a substrate or on a primer coating, preferably an impact resistant primer coating.

Also, the (meth)acrylate based curable layer can be used as a primer layer that has preferably a thickness from 0.5 to 2 microns, and better less than 1.0 microns.

Generally, the anti-soiling coating will have a surface energy of less than $15 \ mJ/m^2$, preferably less than $14 \ mJ/m^2$ and more preferably less than $13 \ mJ/m^2$, and even better less than $12 \ mJ/m^2$ and a thickness of 1 to 100 nm, preferably 1 to 60 nm, more preferably 10 to 60 nm. The anti-soiling coating may also be as thin as 1 to 10 nm, preferably 1 to 5 nm.

In the present invention, all surface energies are calculated according to the OWENS-WENDT method described in the following document: "Estimation of the surface forces energy of polymers" OWENS D. K., WENDT R. G. (1969) J. APPL. POLYM, SCI., 13, 1741-1747.

The anti-soiling coating layer may be any classical outer coating in the field of optical lenses and in particular an anti-soiling coating (hydrophobic and/or oleophobic top coat).

The anti-soiling coating layer according to the invention is preferably of organic nature. By organic nature in the present invention, it is meant a layer which is comprised of at least 40% by weight, preferably at least 50% by weight of the total weight of the coating layer of organic materials.

A preferred anti-soiling coating layer is a hydrophobic and/or oleophobic top coat, and preferably such a top coat made from a composition comprising at least one fluorinated compound.

Preferred fluoro compounds are silanes and silazanes bearing at least one group selected from fluorocarbons, polyfluorocarbons, fluoropolyethers and polyfluoropolyethers, in particular perfluoropolyethers.

Fluorocompounds are disclosed, among others, in U.S. Pat. No. 4,410,563, EP-0 203 730, EP-749 021, EP-844 265 and EP-933 377.

Among fluorosilanes there may be cited the compounds of formulae:

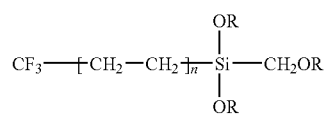

n=5, 7, 9 or 11 and R is an alkyl radical, typically a $C_1-C_0$ alkyl radical such as $-CH_3$, $-C_2H_5$ and $-C_3H_7$;

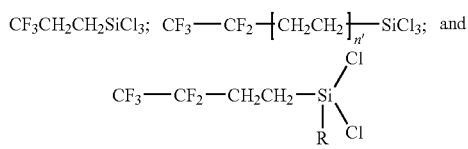

n'=7 or 9 and R is as defined above.

Compositions containing fluoro compounds also useful for making the top coat are disclosed in U.S. Pat. No. 6,183,872.

The silicon-containing organic fluoropolymer is represented by the general formula (I) and has a number average molecular weight of from $5 \times 10^2$ to $1 \times 10^5$.

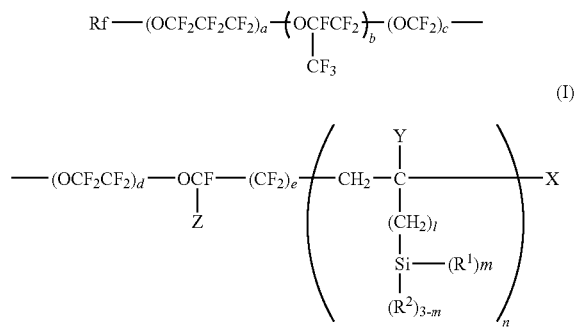

wherein Rf represents perfluoroalkyl; Z represents fluoro or trifluoromethyl; a, b, c, d and e each independently represent 0 or an integer of 1 or above, provided that a+b+c+d+e is not less than 1 and the order of the repeating units parenthesized by subscripts a, b, c, d and e occurring in the formula is not limited to that shown; Y represents hydrogen or alkyl containing 1 to 4 carbon atoms; X represents hydrogen, bromo or iodo; $R^1$ represents hydroxy or a hydrolyzable substituent group; $R^2$ represents hydrogen or a monovalent hydrocarbon group; l represents 0, 1 or 2; m represents 1, 2 or 3; and n represents an integer of 1 or above, preferably 2 or above.

Other classes of preferred compositions for forming the initial top coat are those containing fluoropolyether groups, in particular polyfluoropolyether groups and in particular perfluoropolyether groups. A particular preferred class of compositions containing fluoropolyether groups is disclosed in U.S. Pat. No. 6,277,485.

The anti-soiling top coats of U.S. Pat. No. 6,277,485 are at least partially cured coatings comprising a fluorinated siloxane prepared by applying a coating composition (typically in the form of a solution) comprising at least one fluorinated silane of the following formula

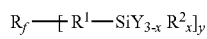

wherein: $R_f$ is a monovalent or divalent polyfluoropolyether group, $R^1$ is a divalent alkylene group, arylene group, or combinations thereof, optionally containing one or more heteroatoms or functional groups and optionally substituted with halids, and preferably containing 2 to 16 carbon atoms; $R^2$ is a lower alkyl group (i.e., a ($C_1$-$C_4$) alkyl group); Y is a halide, a lower alkoxy group (i.e., a ($C_1$-$C_4$) alkoxy group, preferably, a methoxy or ethoxy group), or a lower acyloxy group (i.e., —OC(O)$R^3$ wherein $R^3$ is a ($C_1$-$C_4$) alkyl group); x is 0 or 1; and y is 1 ($R_f$ is monovalent) or 2 ($R_f$ is divalent). Suitable compounds typically have a molecular weight (number average) of at least about 1000. Preferably, Y is a lower alkoxy group and $R_f$ is a perfluoropolyether group.

A commercial composition for making the top coat is the composition KP 801M® commercialized by SHINETSU, or the Optool DSX® product from DAIKIN.

Generally, the anti-soiling coating layer of the coated lens has a thickness ranging from 1 to 100 nm, preferably 1 to 60 nm, more preferably 1 to 5 nm.

The deposition techniques for such anti-soiling coating layers are very diverse, including liquid phase deposition such as dip coating, spin coating (centrifugation). Of which, deposition by dip coating is preferred.

Preferably a plasma or corona treatment may be used for increasing the adhesion between the first and the second layer.

The lens substrate can be made from any material used in the optical field, such as mineral or organic glass, preferably an organic glass.

Examples of such lens substrates are:
diethylene glycol bis(allylcarbonate) polymers and copolymers based substrates;
(meth)acrylic polymers and copolymers based substrates, such as substrates comprising (meth)acrylic polymers and copolymers derived from bisphenol-A;
thio(meth)acrylic polymers and copolymers based substrates;
polythiourethane polymers and copolymers based substrates;
epoxy and/or episulfide polymers and copolymers based substrates; and
polycarbonate based substrates.

In all the examples below the first based methacrylic coating was treated by corona discharge prior to deposition of the second coating having anti-soil properties.

EXAMPLES

Example 1 (Comparative)

This coating formulation is used as a reference for a typical UV curable coating.

A coating formulation consisted of:

| Components | % weight/weight |
|---|---|
| Diethylene glycol diacrylate | 48.74 |
| Dipentaerythritol pentaacrylate | 48.74 |
| Acrylated silicone Oligomer (Ebecryl 1360) | 0.53 |
| Photo-initiator (Irgacure 500) | 1.99 |

Preparation:
1—12.01 grams of diethylene glycol diacrylate were poured in a tube vial.
2—12.01 grams of dipentaerythritol pentaacrylate were added to diethylene glycol diacrylate while mixing. Then the blend was mixed for 30 minutes.
3—0.13 grams of Ebecryl 1360 were added to the previous blend while mixing. Then the blend was mixed for 30 minutes.
4—0.49 grams of Irgacure 500 were added to the previous blend while mixing. Then the blend was finally mixed for 30 minutes.

Coating was spin coated on a polycarbonate lens 10 seconds at speed 4000 rpm and cured via Lesco system H+ U.V. Bulb during 2 times 35 seconds.

The same coating was spin coated on a CR-39® lens 10 seconds at speed 4000 rpm and cured via Lesco system H+ U.V. Bulb during 2 times 35 seconds.

Next, the coated sample was treated with a fluorinated anti soiling agent (Optool DSX® from DAIKIN).

Subsequently, the sample was cured for 1 hour at 50° C.

Example 2

Acryloxypropyl trimethoxysilane is added to a UV curable acrylic coating.

A UV curable coating formulation that consisted of:

| Components | % weight/weight |
|---|---|
| Acryloxypropyltrimethoxysilane | 22.80 |
| Hydrochloric acid (0.1N) | 5.27 |
| Diethylene glycol diacrylate | 35.08 |
| Dipentaerythritol pentaacrylate | 35.09 |
| Acrylated silicone Oligomer (Ebecryl 1360) | 0.34 |
| Photo-initiator (Irgacure 500) | 1.43 |

Preparation of the Coating Composition:

1—38.99 grams of acryloxypropyltrimethoxysilane were poured in a beaker.

2—9.00 grams of hydrochloric acid solution at 0.1 mole.L$^{-1}$ were slowly added to acryloxypropyltrimethoxysilane while mixing. Then the hydrolysis was stopped after 2 hours.

3—59.99 grams of diethylene glycol diacrylate were added while mixing. Then this blend was mixed for 30 minutes.

4—60.01 grams of dipentaerythritol pentaacrylate were added while mixing. Then this blend was mixed for 30 minutes.

5—0.58 grams of Ebecryl 1360 were added while mixing. Then this blend was mixed for 30 minutes.

6—2.45 grams of Irgacure 500 were added while mixing. Then the blend was finally mixed for 30 minutes.

Coating was spin coated on a polycarbonate lens 10 seconds at speed 4000 rpm and cured via Lesco system H+ U.V. Bulb during 2 times 35 seconds.

The same coating was spin coated on CR-39® lens 10 seconds at speed 4000 rpm and cured via Lesco system H+ U.V. Bulb during 2 times 35 seconds.

Next, the coated lens was treated with a fluorinated top coating Optool (DSX) solution by dip coating.

Subsequently the treated lenses were cured for 50 minutes at 100° C.

Example 3

Functionalized particles of acrylated colloid silica are added to a UV curable acrylic coating.

A UV curable coating formulation that consisted of:

| Components | % weight/weight |
|---|---|
| Acrylated colloid silica (OG 103-31) | 24.04 |
| Diethylene glycol diacrylate | 37.07 |
| Dipentaerythritol pentaacrylate | 37.01 |
| Acrylated silicone Oligomer (Ebecryl 1360) | 0.37 |
| Photo-initiator (Irgacure 500) | 1.51 |

Preparation of the Coating Composition:

1—7.79 grams of acrylated colloid silica (OG 103-31) were poured in a beaker.

2—12.01 grams of diethylene glycol diacrylate were added while mixing. Then this blend was mixed for 30 minutes.

3—11.99 grams of dipentaerythritol pentaacrylate were added while mixing. Then this blend was mixed for 30 minutes.

4—0.12 grams of Ebecryl 1360 were added while mixing. Then this blend was mixed for 30 minutes.

5—0.49 grams of Irgacure 500 were added to the previous blend. Then the blend was finally mixed for 30 minutes.

Coating was spin coated on a polycarbonate lens 10 seconds at speed 4000 rpm and cured via Lesco system H+ U.V. Bulb during 2 times 35 seconds.

The same coating was spin coated on CR-39®lens 10 seconds at speed 4000 rpm and cured via Lesco system H+ U.V. Bulb during 2 times 35 seconds.

Next, the sample was coated with a fluorinated anti-soiling agent (Optool DSX® from DAIKIN) top coating solution by dip coating Subsequently, the samples were cured for 1 hour at 50° C.

Example 4

A hybrid of organic silane is added to a UV curable acrylic coating.

This hybrid additive is designed to be subsequently reacting with the DSX and form a strong bond through silanol condensation.

A UV curable coating formulation that consisted of:

| Components | % weight/weight |
|---|---|
| Acryloxypropyltrimethoxysilane | 22.80 |
| Hydrochloric acid (0.1N) | 5.27 |
| Diethylene glycol diacrylate | 35.08 |
| Dipentaerythritol pentaacrylate | 35.09 |
| Acrylated silicone Oligomer (Ebecryl 1360) | 0.34 |
| Photo-initiator (Irgacure 500) | 1.43 |

Preparation of the Coating Composition:

1—38.99 grams of acryloxypropyltrimethoxysilane were poured in a beaker.

2—9.00 grams of hydrochloric acid solution at 0.1 mole.L$^{-1}$ were slowly added to acryloxypropyltrimethoxysilane while mixing. Then, the hydrolysis was stopped after 2 hours.

3—59.99 grams of diethylene glycol diacrylate were added while mixing. Then this blend was mixed for 30 minutes.

4—60.01 grams of dipentaerythritol pentaacrylate were added while mixing. Then this blend was mixed for 30 minutes.

5—0.58 grams of Ebecryl 1360 were added while mixing. Then this blend was mixed for 30 minutes.

6—2.45 grams of Irgacure 500 were added to the previous blend while mixing. Then the blend was finally mixed for 30 minutes.

Coating was spin coated on a polycarbonate lens 10 seconds at speed 4000 rpm and cured via Lesco system H+ U.V. Bulb during 2 times 35 seconds.

The same coating was spin coated on CR-39(lens 10 seconds at speed 4000 rpm and cured via Lesco system H+ U.V. Bulb during 2 times 35 seconds.

Next, the coated lens was treated with a fluorinated material Optool DSX® from DAIKIN by dip coating method.

Subsequently the treated lenses were cured for 1 minute at 70° C. by infra-red heater.

Example 5

A hybrid of organic silane is added to a UV curable acrylic coating. This hybrid additive is designed to be subsequently reacting with the DSX and form a strong bond through silanol condensation.

A UV curable coating formulation that consisted of:

| Components | % weight/weight |
|---|---|
| glycidoxypropyltrimethoxysilane | 21.68 |
| Acryloxypropyltrimethoxysilane | 21.54 |
| Hydrochloric acid (0.1N) | 11.58 |
| Diethylene glycol diacrylate | 22.07 |
| Dipentaerythritol pentaacrylate | 22.07 |
| Acrylated silicone Oligomer (Ebecryl 1360) | 00.18 |
| Photo-initiator (Irgacure 500) | 00.88 |

Formulation:

1—5.90 grams of acryloxypropyltrimethoxysilane were poured in a beaker.

2—5.86 grams of glycidoxypropyltrimethoxysilane were poured in a beaker.

3—3.15 grams of hydrochloric acid solution at 0.1 mole.$L^{-1}$ were slowly added to acryloxypropyltrimethoxysilane and glycidoxypropyltrimethoxysilane while mixing. Then, the hydrolysis was stopped after 2 hours.

4—6.00 grams of diethylene glycol diacrylate were added while mixing. Then this blend was mixed for 30 minutes.

5—6.00 grams of dipentaerythritol pentaacrylate were added while mixing. Then this blend was mixed for 30 minutes.

6—0.05 grams of Ebecryl 1360 were added while mixing. Then this blend was mixed for 30 minutes.

7—0.24 grams of Irgacure 500 were added to the previous blend while mixing. Then the blend was finally mixed for 30 minutes.

Coating was spin coated on a polycarbonate lens 10 seconds at speed 4000 rpm and cured via Lesco system H+ U.V. Bulb during 2 times 35 seconds.

The same coating was spin coated on a CR-39™ lens 10 seconds at speed 4000 rpm and cured via Lesco system H+ U.V. Bulb during 2 times 35 seconds.

Next, the lenses were coated with a fluorinated solution (0.60% Optool DSX™ within Demnum™ solvent) top coating solution by dip coating technique.

Subsequently the treated lenses were cured for 1 minute at 90° C. by infra-red heater.

Results

The lenses obtained according to examples 1-5:

by solvent or treated with a caustic solution for comparative example 1, demonstrating a lower adhesion of the anti-soiling agent.

What is claimed is:

1. A substrate having at least one main surface comprising a first coating deposited on said main surface and a second coating having anti-soiling properties deposited and adhering on the surface of said first coating,
    the first coating being a (meth)acrylate based coating and being obtained by polymerizing a polymerizable composition comprising:
        i) at least one (meth)acrylate compound and
        ii) at least one compound I having at least one —M—Z' bond with M representing Si or a Metal atom, Z' representing OH or a hydrolysable group, and at least one ethylenic unsaturated group or epoxy group, and/or
        iii) at least one silica or metal oxide colloid having free ethylenically unsaturated groups;
    and
    the second coating, having anti-soiling properties, being obtained by depositing on said first coating an anti-soiling coating composition comprising at least one compound II, or a hydrolyzate thereof, having at least one —Si—Z" group with Z" representing OH or a hydrolysable group.

2. A substrate according to claim 1, wherein said polymerizable first coating composition comprises at least one metal alkoxide compound that do not contain any reactive unsaturated group.

3. A substrate according to claim 1, wherein compound I is a colloidal silica having free acryloxy groups.

4. A substrate according to claim 3, wherein compound II is a silane or a silazane bearing at least one group selected from fluorocarbons, polyfluorocarbons, fluoropolyethers and polyfluoropolyethers.

5. A substrate according to claim 1, wherein said polymerizable first coating composition comprises from 2 to 50% by weight of compound I.

6. A substrate according to claim 1, wherein said polymerizable first coating composition comprises from 10 to 40% by weight of compound I.

7. A substrate according to claim 1, wherein the unsaturated group is a (meth)acryloxy group or a vinyl group.

8. A substrate according to claim 1, wherein the second coating having anti-soiling properties is hydrophobic and/or oleophobic.

9. A substrate according to claim 1, wherein compound II is a fluoro compound.

| EXAMPLE | INITIAL WATER CONTACT ANGLE BEFORE DSX TREATMENT (degrees) | AFTER SOLVENT WASH CONTACT ANGLE (degrees) 30 min./60 min. | AFTER CAUSTIC HYDROLYSIS CONTACT ANGLE (degrees) 1 min./30 min. |
|---|---|---|---|
| Example 1 (comparative) | 70.4 | 64.7/61.7 | 51.2/53.5 |
| Example 2 | 112.7 | 113.7/115.0 | 111.5/112.9 |
| Example 3 | 115.3 | 116.2/114.7 | 117.6/117.3 |
| Example 4 | 113.5 | 115.0/117.2 | 116.4/112.2 |
| Example 5 | 72.49 | | 107/107 |

Based on the examples 2 to 4 and comparative example 1, it appears clearly that the contact angle is initially lower in comparative example 1, and moreover that there is a big decrease of the contact angle when the substrates are washed 10. A substrate according to claim 1, wherein compound II is a silane comprising polyfluoro polyether groups.

11. A substrate according to claim 1, wherein compound II is represented by the general formula (I)

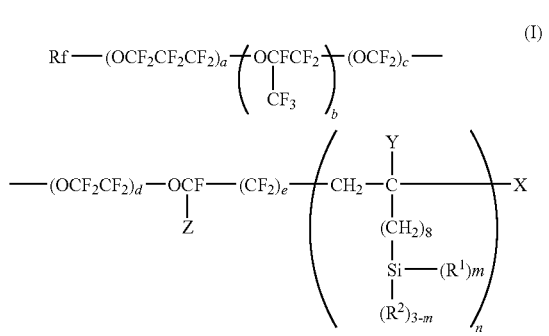

and has a number average molecular weight of from $5\times10^2$ to $1\times10^5$ wherein Rf represents perfluoroalkyl; Z represents fluoro or trifluoromethyl; a, b, c, d and e each independently represent 0 or an integer of 1 or above, provided that a+b+c+d+e is not less than 1 and the order of the repeating units parenthesized by subscripts a, b, c, d and e occurring in the formula is not limited to that shown; Y represents hydrogen or alkyl containing 1 to 4 carbon atoms; X represents hydrogen, bromo or iodo; $R^1$ represents hydroxy or a hydrolyzable substituent group; $R^2$ represents hydrogen or a monovalent hydrocarbon group; I represents 0, 1 or 2; m represents 1, 2 or 3; and n represents an integer of 1 or above, preferably 2 or above.

12. A substrate according to claim 1, wherein the second coating having anti-soiling properties is deposited by dip coating or spin coating, preferably by dip coating.

13. A substrate according to claim 1, wherein said polymerizable coating composition comprises:
   i) at least one (meth)acrylate compound and
   ii) at least one compound I having at least one —M—Z' bond with M representing Si or a Metal atom, Z representing OH or a hydrolysable group, and at least one epoxy group, and optionally
   iii) at least one silica or metal oxide colloid having free ethylenically unsaturated groups.

14. A substrate according to claim 1, wherein said polymerizable first coating composition comprises:
   i) at least one (meth)acrylate compound and
   ii) at least one silica or metal oxide colloid having free ethylenically unsaturated groups and optionally
   iii) at least one compound I having at least one —M—Z' bond with M representing Si or a Metal atom, Z' representing OH or a hydrolysable group, and at least one ethylenic unsaturated group or epoxy group.

15. A substrate according to claim 1, wherein said at least one (meth)acrylate compound is selected from the group consisting of: allyl methacrylate; 2-ethoxyethyl acrylate; 2-ethoxyethyl methacrylate; caprolactone acrylate; isobornyl methacrylate; lauryl methacrylate; polypropylene glycol monomethacrylate; 1,4-butanediol diacrylate; 1,6-hexanediol diacrylate; 1,6-hexanediol dimethacrylate; polyethylene glycol diacrylate; tetraethylene glycol diacrylate; polyethylene glycol dimethacrylate; polyethylene glycol diacrylate; ethoxylated bisphenol A diacrylate; tetraethylene glycol diacrylate; tripropylene glycol diacrylate; neopentyl glycol diacrylate; 1,4-butanediol dimethacrylate; tetraethylene glycol dimethacrylate; diethylene glycol diacrylate; trimethylolpropane trimethacrylate; trimethylolpropane triacrylate; pentaerythritol triacrylate; ethoxylated trimethylolpropane triacrylate; trimethylolpropane trimethacrylate; dipentaerythritol pentaacrylate; pentaerythritol tetraacrylate; ethoxylated pentaerythritol tetraacrylate; and pentaacrylate ester.

* * * * *

UNITED STATES PATENT AND TRADEMARK OFFICE
CERTIFICATE OF CORRECTION

| | | |
|---|---|---|
| PATENT NO. | : 7,678,464 B2 | Page 1 of 1 |
| APPLICATION NO. | : 10/557284 | |
| DATED | : March 16, 2010 | |
| INVENTOR(S) | : Hoa Thien Dang et al. | |

It is certified that error appears in the above-identified patent and that said Letters Patent is hereby corrected as shown below:

In title page, item (75) Inventors, delete "Hao" and insert --Hoa-- therefor.

In title page, item (86) § 371(c)(1), (2), (4) Date, delete "November 17, 2005" and insert --November 18, 2005-- therefor.

In claim 13, column 11, line 35, delete "Z" and insert -- Z' -- therefor.

Signed and Sealed this

Thirteenth Day of July, 2010

David J. Kappos
*Director of the United States Patent and Trademark Office*